(12) United States Patent
Sharp

(10) Patent No.: US 10,486,912 B2
(45) Date of Patent: Nov. 26, 2019

(54) BELT ALIGNMENT SYSTEM WITH DUAL GUIDE ROLLERS AND HAVING MIDDLE PIVOTING ROLLER

(71) Applicant: David A. Sharp, Timmins (CA)

(72) Inventor: David A. Sharp, Timmins (CA)

( * ) Notice: Subject to any disclaimer, the term of this patent is extended or adjusted under 35 U.S.C. 154(b) by 0 days.

(21) Appl. No.: 16/022,368

(22) Filed: Jun. 28, 2018

(65) Prior Publication Data

US 2019/0009992 A1 Jan. 10, 2019

Related U.S. Application Data

(60) Provisional application No. 62/528,649, filed on Jul. 5, 2017.

(51) Int. Cl.
| | |
|---|---|
| *B65G 39/12* | (2006.01) |
| *B65G 15/00* | (2006.01) |
| *B65G 39/16* | (2006.01) |
| *B65G 15/64* | (2006.01) |
| *B65G 15/08* | (2006.01) |

(52) U.S. Cl.
CPC ............ *B65G 39/16* (2013.01); *B65G 15/64* (2013.01); *B65G 15/08* (2013.01)

(58) Field of Classification Search
None
See application file for complete search history.

(56) References Cited

U.S. PATENT DOCUMENTS

| | | |
|---|---|---|
| 2,132,052 A | 10/1938 | Sollenberger |
| 2,132,053 A | 10/1938 | Sollenberger et al. |
| 2,869,712 A | 1/1959 | Kindig |
| 3,038,588 A | 6/1962 | Arndt et al. |
| 3,056,578 A | 10/1962 | Auger |

(Continued)

FOREIGN PATENT DOCUMENTS

| | | |
|---|---|---|
| CN | 201313742 Y | 9/2009 |
| CN | 204847112 U | 12/2015 |

(Continued)

OTHER PUBLICATIONS

International Search Report from International Patent Application No. PCT/CA2018/000132, dated Oct. 2, 2018.

(Continued)

*Primary Examiner* — Kavel Singh
(74) *Attorney, Agent, or Firm* — Greer, Burns & Crain, Ltd.

(57) ABSTRACT

An alignment system having a conveyor belt trained over rollers on a conveyor frame including a support bracket having a center support and a pair of opposing arms and each arm having an associated first end. The system further includes at least one pivoting member including a torque arm that is mounted to one of the first ends of the support bracket. At least one outside tracking roller is mounted to bracket where each roller includes at least one shaft having an inner and an outer end. Outer end of the shaft is coupled to an associated torque arm and inner end is coupled to one of the opposing arms. A middle tracking roller is mounted to the support bracket and middle tracking roller is arranged so that pivoting action of one of the torque arms and middle roller causes pivoting action of the other opposing arm and middle roller.

19 Claims, 6 Drawing Sheets

(56) References Cited

U.S. PATENT DOCUMENTS

| | | |
|---|---|---|
| 3,058,573 A | 10/1962 | Lo Presti |
| 3,066,547 A | 12/1962 | Evans et al. |
| 3,187,881 A | 6/1965 | Clark |
| 3,240,321 A | 3/1966 | Lo Presti et al. |
| 3,259,227 A * | 7/1966 | Steinmetz ............ B65G 39/125 198/501 |
| 3,368,665 A | 2/1968 | Jinkins |
| 3,496,619 A | 2/1970 | Constant |
| 3,593,841 A | 7/1971 | Leow |
| 3,777,878 A | 12/1973 | Morrison |
| 3,946,619 A | 3/1976 | Needles et al. |
| 4,032,002 A | 6/1977 | Jackson |
| 4,072,611 A | 2/1978 | Davis |
| 4,092,914 A | 6/1978 | Burrough et al. |
| 4,231,161 A | 11/1980 | Belfiore |
| 4,527,440 A | 7/1985 | Heitman et al. |
| 4,544,061 A | 10/1985 | Crandall |
| 4,693,363 A | 9/1987 | Kuehnert |
| 4,765,455 A | 8/1988 | Matsuno et al. |
| 5,117,969 A | 6/1992 | Roth |
| 6,131,726 A | 10/2000 | Hovsto et al. |
| 6,520,717 B1 | 2/2003 | Otto et al. |
| 6,634,490 B2 | 10/2003 | Fischer et al. |
| 7,051,867 B2 * | 5/2006 | Sharp ..................... B65G 15/60 198/806 |
| 7,614,493 B2 | 11/2009 | Dowling et al. |
| 7,967,129 B2 * | 6/2011 | Swinderman .......... B65G 39/16 198/808 |
| 8,376,127 B2 | 2/2013 | Sharp |
| 8,800,755 B2 * | 8/2014 | Sharp ..................... B65G 15/60 198/806 |
| 9,033,135 B1 | 5/2015 | Sharp |
| 2004/0079621 A1 | 4/2004 | Mott |
| 2010/0006402 A1 | 1/2010 | Sharp |
| 2011/0272250 A1 | 11/2011 | DeVries |

FOREIGN PATENT DOCUMENTS

| | | |
|---|---|---|
| JP | 2003-300609 A | 10/2003 |
| JP | 4994774 B2 | 8/2012 |
| WO | 2005-108250 A1 | 11/2005 |

OTHER PUBLICATIONS

Written Opinion of the International Searching Authority from International Patent Application No. PCT/CA2018/000132, dated Oct. 2, 2018.

* cited by examiner

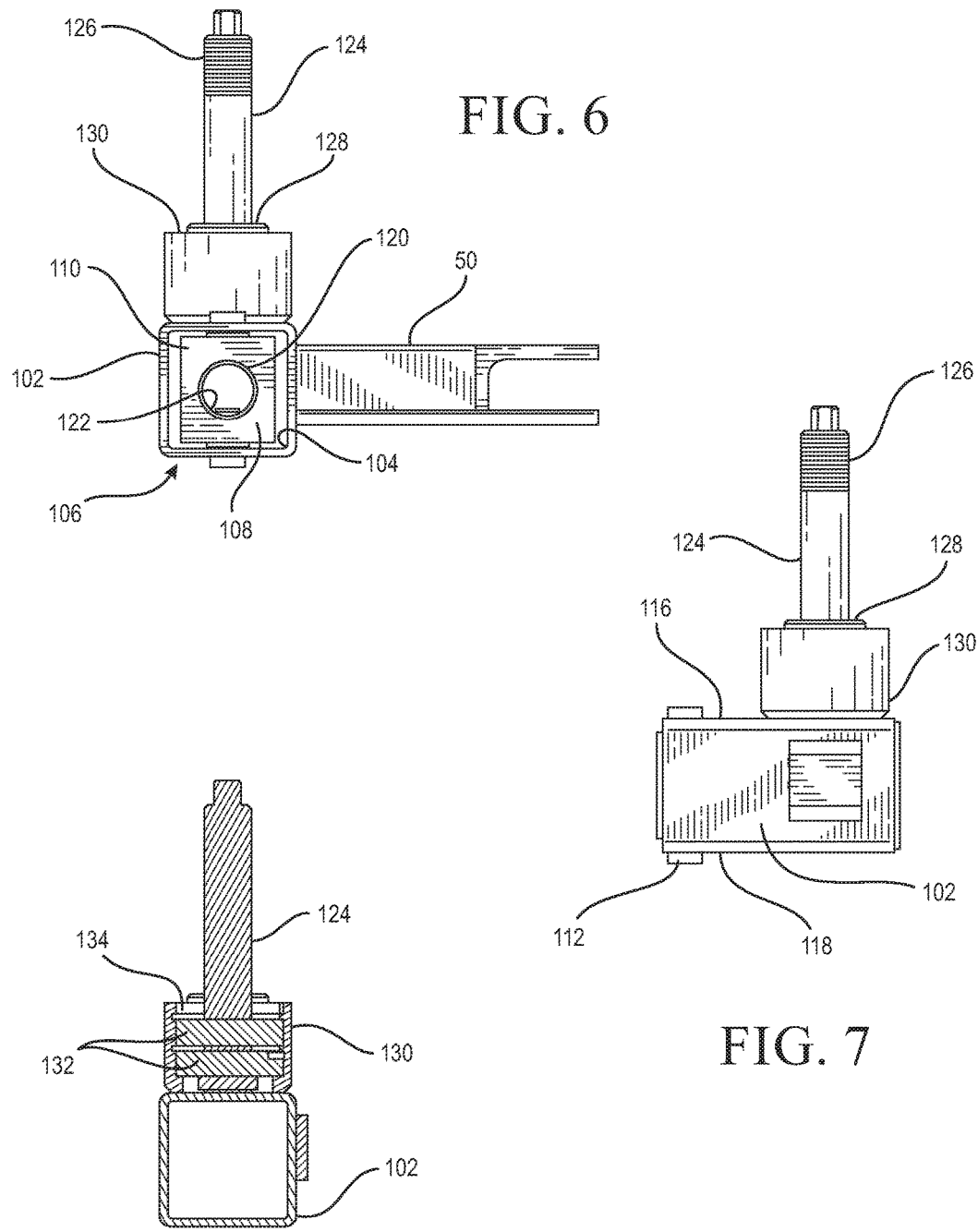

though lateral movement of the belt, which actuates reciprocal pivoting action of the at least one outside tracking roller and middle tracking roller relative to said support structure. During movement, at least one pivoting member and the middle tracking roller pivot in the same direction.

BELT ALIGNMENT SYSTEM WITH DUAL GUIDE ROLLERS AND HAVING MIDDLE PIVOTING ROLLER

RELATED APPLICATION

This application claims priority under 35 USC 119 from U.S. Provisional Application No. 62/528,649 filed Jul. 5, 2017, the contents of which are incorporated by reference.

BACKGROUND

The present invention relates to the operation of conveyor belts, such as those known as endless belts supported by a series of parallel support rollers, and more particularly to a system for maintaining alignment of a conveyor belt during operation.

Belt tracking, or maintaining a conveyor belt moving in a generally straight, designated path, is a problem in any industry that uses conveyor belts. It is often not a major problem but rather a maintenance nuisance that progressively over time becomes a major cost.

Several factors can affect belt tracking. Misalignment of the rollers will cause corresponding belt tracking problems. Also, uneven loading of conveyor belts may also cause tracking problems, as well as unequal driving forces across the belt width.

Further, it is common for a tracking device for conveyor belts to fail prematurely. Carry back material (material that has not been removed by a belt scraper at the conveyor discharge point) for instance may cause material build up and result in the rollers and pivot mechanism to seize into a misalignment position.

Various conveyor belt systems have been developed over the years with design considerations relating to accurate tracking. With respect to any belt, the ability to track will vary considerably, and this in turn is due to a number of variables involved in the production of a belt itself. Compounding this problem is the possibility that the belt might be stretched upon installation. Over correction during initial tracking adjustments may result in stretching the belt in inappropriate areas. It has also been observed that existing tracking devices will only align a conveyor belt once it is way off center, thereby resulting in serious damage and down time.

In U.S. Pat. No. 7,051,867, which is incorporated by reference, a suitable belt alignment system includes a pair of pivoting members, each mounted on a corresponding support bracket. Each pivoting member is configured for supporting one of a pair of tracking rollers at a corresponding tracking roller shaft end. Each shaft end is pivotally and non-rotatably attached to a corresponding pivoting member by a ball bushing mounted in a corresponding one of the pivoting members.

In U.S. Pat. No. 8,376,127, which is also incorporated by reference, a belt alignment system includes a pair of pivoting members, where each pivoting member is configured for supporting one of a pair of tracking rollers at a corresponding tracking roller shaft end. The shaft ends are each pivotally and non-rotatably attached to a corresponding pivoting member by a bushing mounted in a rotatable block in a corresponding one of the pivoting members.

In U.S. Pat. No. 9,033,135, which is also incorporated by reference, a belt alignment system includes a support bracket and two racking rollers independently mounted to the support bracket where the tracking rollers include a shaft being coupled to pivoting members on one end and a center support on the other end of the shaft. Movement of the pivoting members causes the tracking rollers to pivot relative to the center support. A guide control bar having two ends is pivotally connected to a corresponding torque arm at each end, where the guide control bar includes a pair of guide rollers positioned at both edges of the conveyor belt.

In applications using a wide conveyor belt, the shaft including the tracking rollers that supports the belt should be equal to or wider than the belt to provide sufficient support for the belt. The added weight from the wider belt and any residual product or dirt remaining on the belt, increases the stress forces on the bushings at the shaft ends, which increases the wear on the bushings and the risk of malfunction or failure. Also in conveyor systems including cupped or v-shaped conveyor belts, belt alignment systems having a single shaft only provide support at the central portion of the belts that contact the rollers. The more weight on a steering roller, the more traction and friction between the rollers and the belt. As a result, the force from the weight of the belt is greatest at the center of the shaft between the bushings which can lead to bending or failure of the shaft.

Thus, there is a need for a belt alignment system that addresses the above-listed operational drawbacks of existing units.

SUMMARY

The present belt alignment system with dual guide or tracking rollers and a middle pivoting roller addresses the disadvantages of the prior art by providing an improved system featuring multiple angled tracking rollers and a middle roller that generally conform to angled or cupped conveyor belts and provide additional support to conveyor belts traversing relative wide spans.

More specifically, an alignment system is provided for a conveyor having a conveyor belt trained over rollers on a conveyor frame where the system includes a support bracket having a center support and a pair of opposing arms, and each arm having an associated first end. The alignment system further includes at least one pivoting member including a torque arm that is pivotally associated with one of the first ends of the support bracket. At least one outside tracking roller is mounted to the support bracket, where each tracking roller includes at least one shaft having an inner end and an outer end. The outer end of the shaft is coupled to an associated torque arm, and the inner end is coupled to an associated one of the opposing arms. A middle tracking roller is pivotally mounted to the support bracket and, through a linkage assembly, the middle tracking roller is constructed and arranged so that pivoting action of one of the torque arms and the middle tracking roller causes pivoting action of the other opposing torque arm and the middle tracking roller.

In another embodiment, an alignment system for a conveyor having a conveyor belt trained over rollers on a conveyor train further includes a guide control bar having at least one guide roller associated with the guide control bar and being constructed and arranged to laterally engage a conveyor belt. The at least one guide roller is engaged through lateral movement of the belt, which actuates reciprocal pivoting action of the at least one outside tracking roller and middle tracking roller relative to said support structure. During movement, at least one pivoting member and the middle tracking roller pivot in the same direction.

BRIEF DESCRIPTION OF THE DRAWINGS

FIG. 6 is a front view of the pivoting member of FIG. 4;

FIG. 7 is a side view of the pivoting member of FIG. 4;

FIG. 8 is a cross-section view of the pivoting member taken substantially along the line 8-8 of FIG. 5 and in the direction generally indicated.

DETAILED DESCRIPTION

Figure 1:
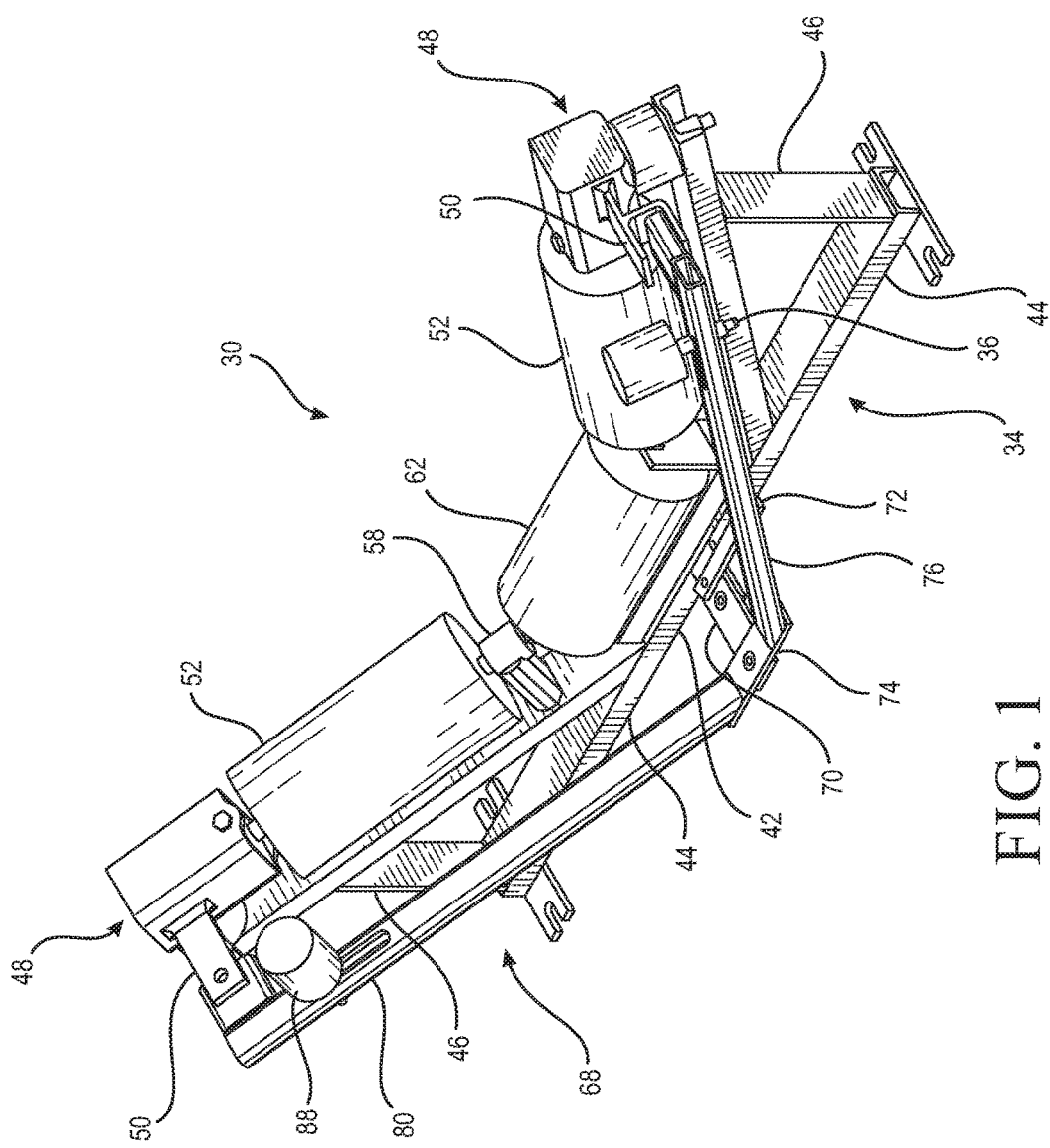
FIG. 1 is a top perspective view of an embodiment of the present belt alignment system.
Figure 2:
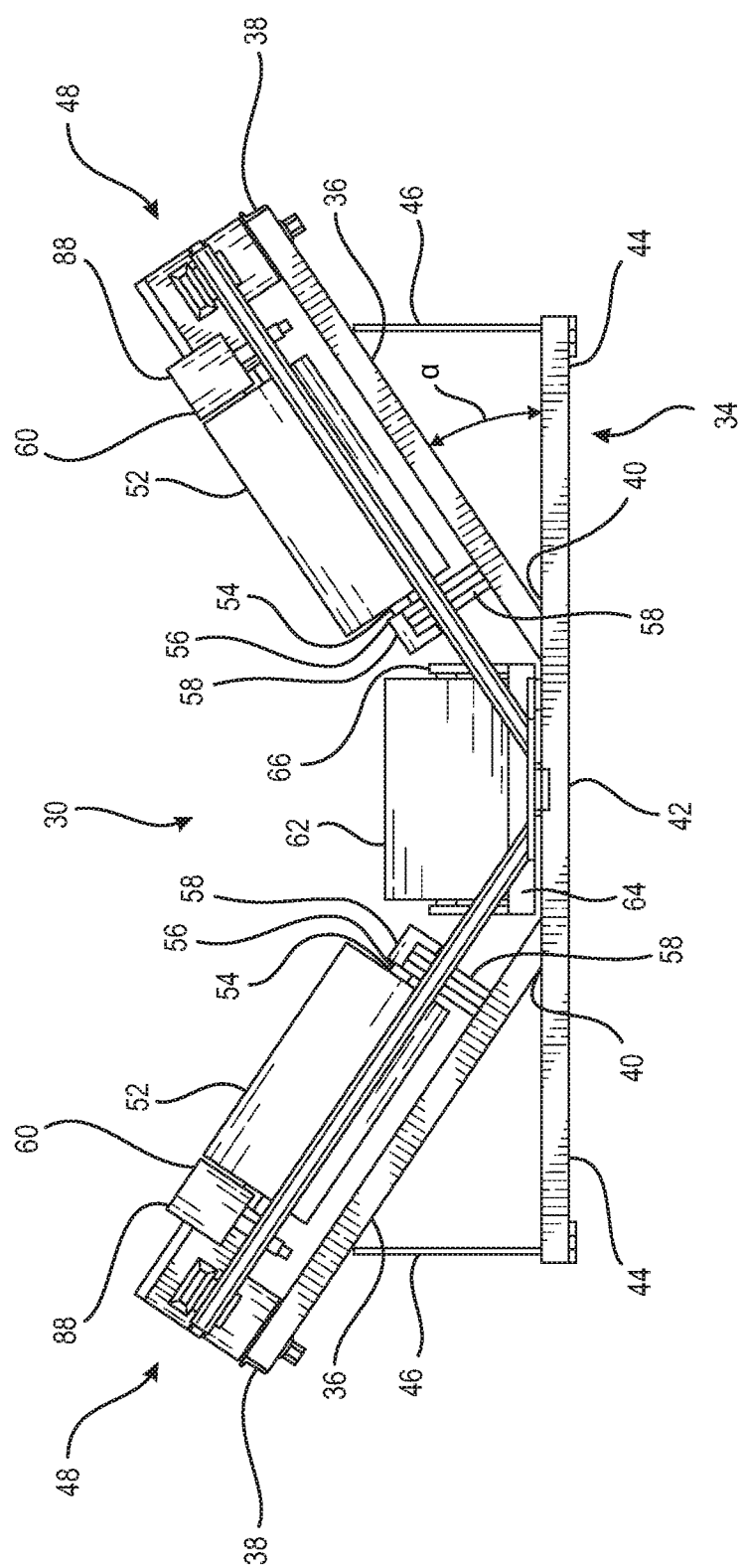
FIG. 2 is a front view of the belt alignment system of FIG. 1.
Figure 3:
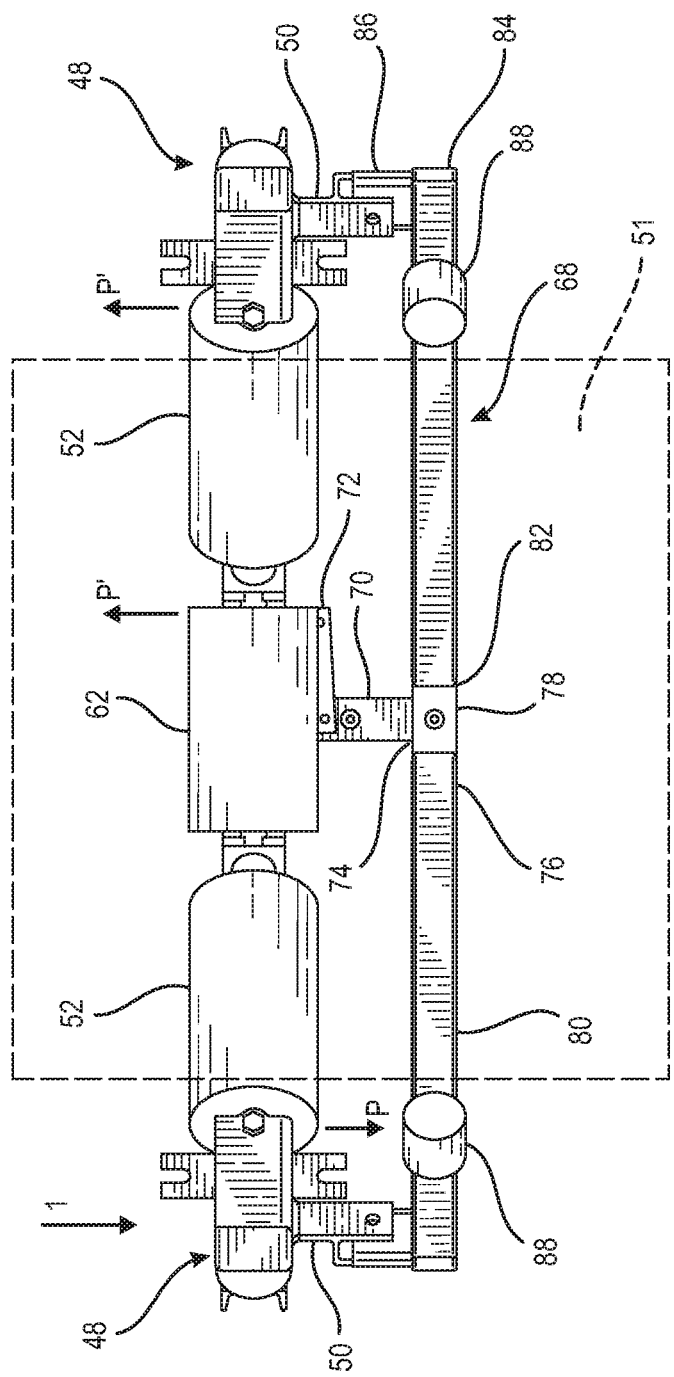
FIG. 3 is a top view of the belt alignment system of FIG. 1.
Figure 5:
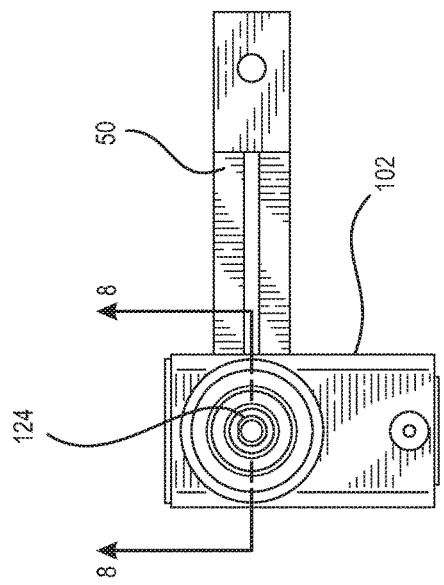
FIG. 5 is a top view of the pivoting member of FIG. 4.
Figure 4:
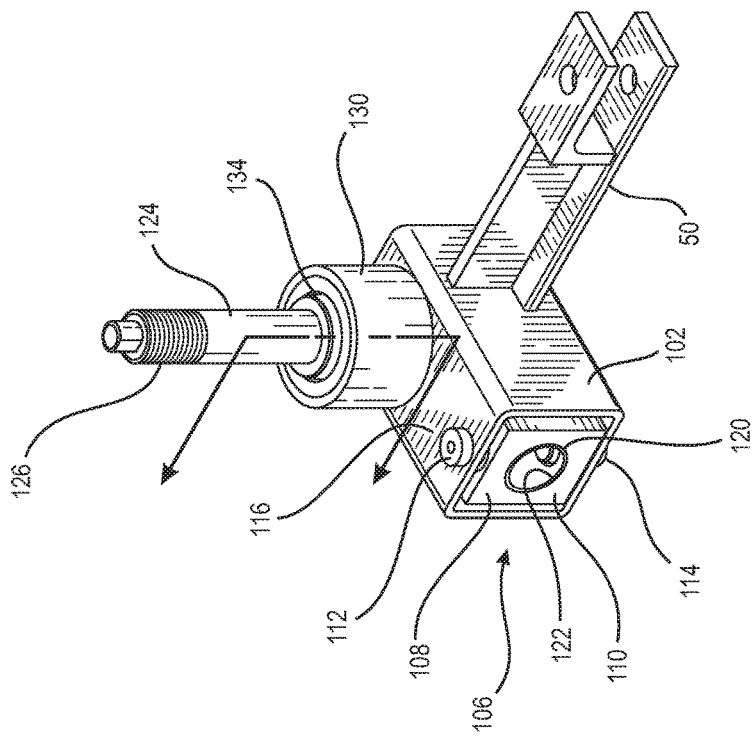
FIG. 4 is a perspective view of a pivoting member of the present belt alignment system of FIG. 1.

Referring to FIGS. 1-3, the present conveyor belt alignment system, generally designated 30, is intended for use in combination with a conveyor of the type having an elongated flexible endless belt trained on a conveyor frame (not shown) over a head roller and a tail roller (not shown), where the head roller is rotatably powered by a conveyor drive. The belt alignment system 30 is movably mounted to the to the conveyor frame by a support bracket, generally designated 34, by welding, fasteners or other suitable connectors or connection techniques. Note, the present system 30 is mountable to the conveyor frame either on the top, carrying, troughing or loaded side of the belt, or on the bottom or return side of the belt.

The support bracket 34 has at a pair of opposing, generally inclined arms 36, each having a first end 38 and an associated second end 40. The support bracket 34 also includes a center support 42 positioned between the second end 40 of the pair of opposing arms 36 and bottom bracket members 44 being contiguous and adjacent to the center support 42. Vertical bracket support members 46 are each secured to the bottom bracket members 44 on a first end and to an associated one of the pair of opposing arms 36 on a second end, configured to provide structure and support force on the opposing arms 36 resulting from operation of the conveyor.

In addition, the present conveyor belt alignment system 30 includes at least one pivoting member 48 pivotally associated with each of the opposing arms 36, more preferably being mounted on the first end 38 of the opposing arms 36, the at least one pivoting member 48 including at least one torque arm 50. Each torque arm 50 projects laterally outside of a conveyor belt 51 shown in phantom in FIG. 3.

At least one outside guide or tracking roller 52 is mounted to the support bracket 34 on the associated opposing arm 36, where the tracking roller 52 includes at least one shaft 54 having an inner end 56 fixed to a ball bushing 58, and an outer end 60 fixed to the at least one pivoting member 48. The roller mounting member 58 is fixed to the opposing arms 36 at a location relative to the length of the outside tracking roller 52. It should be noted that the shaft 54 need not extend continuously through the corresponding tracking roller 52 but may be provided in shaft segments, that the rollers 52 could also be metal such as steel, lagged rollers or rollers made out of rubber, urethane, castellated rubber or any suitable material or combination of materials as is well known in the art.

It should be understood that it is contemplated that the configuration of the support bracket 34, including but not limited to the orientation and size of the arms 36, may vary depending on the particular application, and similarly, the size, diameter and arrangement of the tracking rollers 52 and the pivot members 48 may change to accommodate variations in loading, belt speed, as well as the size and weight of the conveyor belt as well as the material being conveyed.

Also included on the present conveyor belt alignment system is a middle tracking roller 62 pivotally mounted to the center support 42 of said support bracket 34. The middle tracking roller 62 is secured in a U-shaped bracket 64 having a shaft 66 constructed and arranged to rotatably secure the middle roller 62 to the bracket 64. Shaft ends of the middle tracking roller 62 are preferably nonrotatably fixed to the U-shaped bracket 64. While it is preferred that the middle tracking roller 62 is located centrally between the tracking rollers 52, other, non-centered locations are contemplated. The middle tracking roller 62 is constructed and arranged so that pivoting action of the torque arm 50 and said middle roller 62 causes pivoting action of the other of the arm 50 and the middle roller 62 by operation of a linkage assembly 68. An important feature of the middle tracking roller 62 is that its location between the tracking rollers 52 means that it accommodates a significant portion of the weight of the conveyed material, typically gravel, minerals or the like. As such, the middle roller 62 performs a significant belt steering function.

Included on the linkage assembly 68 is at least one bar linkage mechanism 70 having both a first end 72 and a second end 74. The first end 72 of the linkage mechanism 70 is fastened to the U-shaped bracket 64 so that pivoting action of the middle tracking roller 62 is controlled by reciprocating movement of the at least one bar linkage mechanism 70. The second end 74 of the linkage mechanism 70 is fastened to a guide control bar 76. The fastening of the first end 72 and said second end 74 is achieved by a bolt, lug, or other known connection that allows pivoting action of the ends 72, 74 relative to the linkage mechanism 70.

The guide control bar 76 includes a middle support 78 and at least one guide control arm 80 having a first end 82 and a second end 84. The first end 82 is contiguous with, and is connected to the middle support 78. The second end 84 of the guide control bar 76 preferably includes a flange 86 pivotably fastened to the torque arm 50 of an associated one of the pivoting members 48. It should be appreciated that the guide control bar 76 is preferably a piece of straight, however any suitable shape is contemplated, and that the at least one arm 80 is mountable relative to the middle support 78 at any suitable angle or combination of angles. Attached to the guide control bar 76 are at least one spaced, freely rotating guide roller 88 positioned on the guide control arm 80 for periodically following or operationally engaging an edge of the conveyor belt 51.

The guide control bar 76 actuates the at least one pivoting member 48, through the torque arm 50. Unlike tracking rollers used in combination with conventional conveyor belt applications, the present alignment system 30 is configured so that the conveyor belt 51 traveling in a direction T (FIG. 3) crosses the tracking rollers 52, 62 before the belt reaches the at least one guide roller 88, thereby ensuring that the guide rollers 52, 62 adjust the correct belt path rather than a mistracking or misaligned path.

In this regard as seen in FIG. 3, when the conveyor belt 51 exerts an outward force upon one of the guide rollers 88, the respective pivoting member 48 pivots, which in turn, causes the respective tracking roller 52 to pivot in a first direction P at the outer end 60 and the opposing tracking roller 52 to pivot in an opposite direction P' at that roller's respective end 60. The middle tracking roller 62 then pivots in the same opposite direction P' as the opposing tracking roller 52 via movement of the pivoting member 48 and the associated linkage assembly 68. The pivoting of the tracking rollers 52, 62 relative to the center support 42 helps to steer or guide the conveyor belt 51 so that the belt is generally centered or aligned on the frame 32. Thus, the guide rollers 52, 62 pivot in unison with the at least one pivoting member 48 and said guide control bar 76 by an amount equal to the amount that the guide rollers 52, 62 move on the frame.

In operation, as the belt 51 travels along the conveyor, the at least one rotating guide roller 88 generally follows the lateral movement of the belt, thereby continuously monitoring and controlling the belt alignment and axis. It is contemplated that when the belt is properly aligned, the guide rollers 88 may not be engaged by the belt. As the belt drifts in one lateral direction the respective guide roller 88 will begin to rotate and also move the guide control bar 76 causing the adjacent pivoting member 48 to rotate about its pivot axis.

As shown in FIGS. 4-8, each pivoting member 48 is generally L-shaped, including the torque arm 50 fixed normally adjacent to an end of a bushing housing 102. Each torque arm 50 is located laterally outside of an edge of the conveyor belt 51 and is connected to a corresponding pivoting member 48. The bushing housing 102 is preferably polygonal and the shape may vary, but in the preferred embodiment, is square in cross-section, and defines a bushing chamber 104. While other materials are contemplated, the preferred bushing housing 102 is three-inch square HSS tubing. It is contemplated that the size of the tubing will vary with the size of the belt. An open end 106 of the bushing chamber 104 located opposite the torque arm 50 forms a location for a rotating bushing 108.

In the illustrated embodiment, the rotating bushing 108 includes a block 110 dimensioned to be freely rotatable about a vertical axis defined by pivot pins 112, 114 engaged in upper and lower walls 116, 118 of the bushing housing 102. The block 110 includes a central bore 120 provided with a circular bushing member 122. In the preferred embodiment, the central bore 120 of the bushing member 122 is configured for individually, pivotally and non-rotatably accommodating at least one of the roller shafts or an optional shaft adapter. The at least one pivoting member 48 is attached or mounted to the support bracket 34 by a mounting pin 124 that extends through a hole (not shown) in the support bracket 34 where an end 126 of the mounting pin including threads is rotatably secured to the support bracket 34 by a suitable fastener. An opposing end 128 of the mounting pin 124 is rotatably mounted in a pivot housing 130 integrally formed with or attached to the bushing housing 102. Specifically, the end 128 of the mounting pin 124 is provided with a pair of bearings 132 (FIG. 8) for facilitating rotation of the pivot housing 130 and the bushing housing 102 relative to the support bracket 34. The interior of the pivot housing 130 is sealed by a cover member 134.

Figure 9:
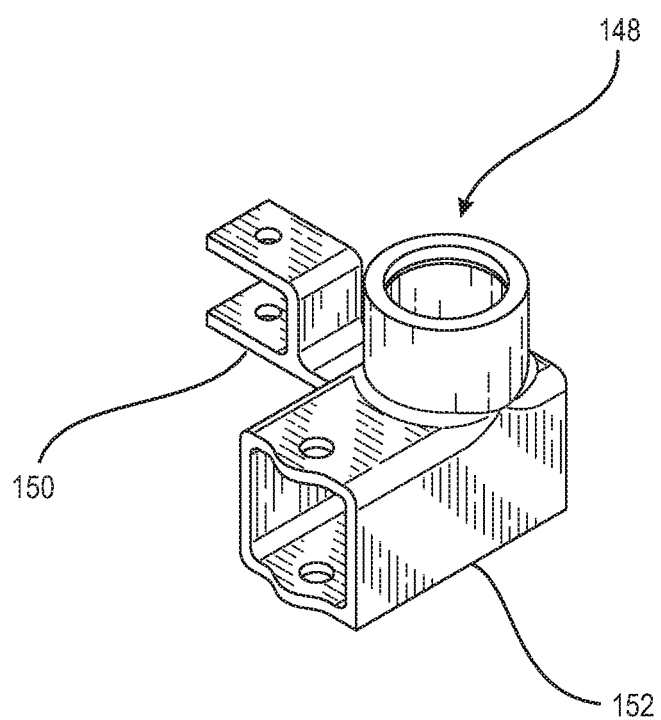
FIG. 9 is an alternate embodiment of the pivoting member shown in FIGS. 4-8.

Referring now to FIG. 9, an alternate embodiment of the pivoting member 48 is generally designated 148. It features a shortened torque arm 150 and a more streamlined bushing housing 152. However, in operation, it is similar to the pivoting member 48.

In another embodiment of the present belt alignment system 30, the at least one outside tracking roller 52, the support bracket 34 and associated pair of opposing arms 36 and/or the guide control bar 76 are configured to have a 45-degree angle relative to a longitudinal or horizontal axis or horizontal line extending through the alignment system 30. It should be appreciated that at least one of the tracking rollers 52, support bracket and the guide control bar 76 can be configured to have an angle α between 0 to 45 degrees relative to the horizontal line. In this regard, the shape or angle of the outside tracking rollers 52, the support bracket 34 and the guide control bar 76 depend at least in part on the shape or angle of the conveyor belt being aligned by the present belt alignment system 30.

The present belt alignment system is configured for installation either on a dirty or loaded side of the conveyor belt 51, or on an inside part or clean side of the conveyor belt where space for installation of the conveyor system is limited by the location or another structure or structures. Such an application will support the conveyor belt 51 and use the weight of the belt to apply tension to one or both tracking rollers to help center the conveyor belt. Specifically, when the belt alignment system 30 is installed on the clean side of the conveyor belt, the tracking rollers 52 push downward on the conveyor belt to apply tension to the belt and ensure sufficient contact between the surface of the conveyor belt and the rollers.

While a particular embodiment of the present conveyor alignment system having a pair of guide rollers and a middle pivoting roller has been shown and described, it will be appreciated by those skilled in the art that changes and modifications may be made thereto without departing from the invention in its broader aspects and as set forth in the following claims.

What is claimed is:

1. An alignment system for a conveyor having a conveyor belt trained over rollers on a conveyor frame, the system comprising:
    a support bracket;
    at least one pivoting member, each said pivoting member including a torque arm, and being pivotally mounted to said support bracket;
    at least one first outside tracking roller and at least one second outside tracking roller, each mounted to said support bracket, each said first and second tracking roller including at least one shaft with an inner end and an outer end, said outer end of at least one of each of said first and second tracking rollers being coupled to an associated said at least one pivoting member and pivotable about said inner end, and said inner end being coupled to said support bracket;
    a middle tracking roller located between said at least one first outside tracking roller and said at least one second outside tracking roller, pivotally mounted to said support bracket and, through a linkage assembly, being constructed and arranged so that pivoting action of one of said torque arms causes pivoting action of the other of said torque arms and said middle tracking roller; and
    wherein said middle tracking roller is mounted in a pivoting bracket relative to a center support of said support bracket, said pivoting bracket being constructed and arranged so that pivoting action of said pivoting bracket actuates said linkage assembly, where said linkage assembly comprising at least one bar linkage member coupled to said middle tracking roller on a first end and a guide control bar on a second end.

2. The alignment system of claim 1, wherein said guide control bar includes a first end being pivotably connected to said torque arm, said torque arm being connected to said pivoting member for common movement.

3. The alignment system of claim 1, wherein said guide control bar includes at least one guide roller associated with said guide control bar and being constructed and arranged to laterally engage a conveyor belt.

4. The alignment system of claim 3, wherein each said pivoting member includes a housing defining a bushing chamber, said rotating bushing includes a block rotatable about a vertical axis defined by pivot pins engaged in upper and lower walls of said housing.

5. The alignment system of claim 4, wherein said block is dimensioned to freely rotate within said bushing chamber.

6. The alignment system of claim 4, wherein said block includes a central bore provided with said bushing member.

7. The alignment system of claim 3, wherein said at least one guide roller is engaged through lateral movement of said belt to actuate reciprocal pivoting action of said at least one outside tracking roller and said middle tracking roller relative to said support structure, where said at least one pivoting member and said middle tracking roller pivot in same direction.

8. The alignment system of claim 1, wherein said support bracket and said guide control bar form an angle of between 0 to 45 degrees relative to a horizontal axis.

9. The alignment system of claim 1, wherein said outer end of said at least one shaft is coupled to said at least one pivoting member by a rotating bushing mounted in said at least one pivoting member.

10. The alignment system according to claim 1, wherein the support bracket is positioned on one of a working flight side or return flight side of the conveyor belt.

11. The alignment system according to claim 10, wherein when the support bracket is positioned on the return flight side of the conveyor belt, said belt may ride on one of the top and beneath said at least one outside tracking rollers and said middle tracking roller.

12. The alignment system of claim 1, wherein the pivoting action of one of said torque arms causes one of said pivoting members and the other of said torque arms to pivot and the pivoting action of the other of said torque arms causes the other of said pivoting members to pivot.

13. An alignment system for a conveyor having a conveyor belt trained over rollers on a conveyor frame, the system comprising:
  a support bracket including a center support and a pair of opposing arms, each said arm having an associated first end;
  at least one pivoting member, each said member including a torque arm, and being pivotally mounted to an associated one of said first ends of said support bracket;
  at least one outside tracking roller mounted to said support bracket, each said tracking roller including at least one shaft with an inner end and an outer end, each said outer end being coupled to an associated said at least one pivoting member, and said inner end being coupled to an associated one of said opposing arms; and
  a middle tracking roller pivotally mounted to said support bracket and, through a linkage assembly, being constructed and arranged so that pivoting action of one of said torque arms and said middle tracking roller causes pivoting action of the other of said arms and said middle tracking roller;
  wherein each said pivoting member includes a housing defining a bushing chamber, a rotating bushing mounted in each said pivoting member includes a block rotatable about a vertical axis defined by pivot pins engaged in upper and lower walls of said housing.

14. The alignment system of claim 13, wherein said block is dimensioned to freely rotate within said bushing chamber.

15. The alignment system of claim 14, wherein said block includes a central bore provided with said bushing member.

16. An alignment system for a conveyor having a conveyor belt trained over rollers on a conveyor frame, the system comprising:
  a support bracket;
  at least one pivoting member, each said pivoting member including a torque arm, and being pivotally mounted to said support bracket;
  at least one first outside tracking roller and at least one second outside tracking roller, each mounted to said support bracket, each said first and second tracking roller including at least one shaft with an inner end and an outer end, said outer end of at least one of each of said first and second tracking rollers being coupled to an associated said at least one pivoting member and pivotable about said inner end, and said inner end being coupled to said support bracket; and
  a middle tracking roller located between said at least one first outside tracking roller and said at least one second outside tracking roller, pivotally mounted to said support bracket for pivoting action about an axis transverse to a direction of travel of the belt, and, through a linkage assembly, being constructed and arranged so that pivoting action of one of said torque arms causes pivoting action of the other of said torque arms and said middle tracking roller.

17. The alignment system of claim 16, wherein said outer end of said at least one shaft is coupled to said at least one pivoting member by a rotating bushing mounted in said at least one pivoting member.

18. The alignment system according to claim 16, wherein the support bracket is positioned on one of a working flight side or return flight side of the conveyor belt.

19. The alignment system according to claim 18, wherein when the support bracket is positioned on the return flight side of the conveyor belt, said belt may ride on one of the top and beneath said at least one outside tracking rollers and said middle tracking roller.

* * * * *